United States Patent [19]
Lang et al.

[11] Patent Number: 4,605,257
[45] Date of Patent: Aug. 12, 1986

[54] EXPANDABLE OPERATOR'S CAB

[75] Inventors: David M. Lang, South Milwaukee; Richard W. Lewitzke, Franklin, both of Wis.

[73] Assignee: Becor Western Inc., South Milwaukee, Wis.

[21] Appl. No.: 742,285

[22] Filed: Jun. 7, 1985

[51] Int. Cl.⁴ .............................................. B62D 33/06
[52] U.S. Cl. ....................................... 296/26; 296/190; 52/36; 52/79.7; 29/401.1
[58] Field of Search ................ 296/190, 197, 196, 26, 296/27, 99 R; 29/401.1, 416; 52/79.7, 36

[56] References Cited

U.S. PATENT DOCUMENTS

| Re. 31,641 | 8/1984 | Derus | 52/109 |
|---|---|---|---|
| 2,751,635 | 6/1956 | Donnahue | 52/79.7 |
| 2,842,972 | 7/1958 | Houdart | 74/91 |
| 3,116,085 | 12/1963 | Uttley | 296/26 |
| 3,223,444 | 12/1965 | Tart | 296/26 |
| 3,564,700 | 2/1971 | Binek | 29/416 |
| 3,675,966 | 7/1972 | Luft | 296/28 C |
| 3,797,880 | 3/1974 | Pezzaglia | 206/26 |
| 3,884,321 | 5/1975 | Drake et al. | 180/89 R |
| 3,885,643 | 5/1975 | Goodbary | 180/89 R |
| 3,888,539 | 6/1975 | Niessner | 296/23 D |
| 3,915,492 | 10/1975 | Agnese | 296/23 C |
| 3,966,075 | 6/1976 | Schultz | 220/1.5 |
| 4,017,116 | 4/1977 | Hulsey | 296/26 |
| 4,049,310 | 9/1977 | Yoder | 296/26 |
| 4,099,313 | 7/1978 | Phillips | 296/26 |
| 4,108,326 | 8/1978 | Bertolini | 220/1.5 |
| 4,114,942 | 9/1978 | Greiner | 296/23 G |
| 4,133,571 | 1/1979 | Fillios | 296/23 C |
| 4,156,537 | 5/1979 | Lincoln | 296/190 |
| 4,185,867 | 1/1980 | Schmidt et al. | 296/187 |
| 4,231,144 | 11/1980 | Bernacchia | 29/401.1 |
| 4,250,975 | 2/1981 | Cobb et al. | 180/89.13 |
| 4,290,244 | 9/1981 | Zeigler | 52/80 |
| 4,300,797 | 11/1981 | Whitley et al. | 296/164 |
| 4,342,146 | 8/1982 | Hanson | 29/416 |
| 4,358,133 | 11/1982 | Stucky | 280/656 |
| 4,392,682 | 7/1983 | Norkus, Jr. | 296/26 |
| 4,397,497 | 8/1983 | Alonzo, Jr. et al. | 296/26 |
| 4,397,498 | 8/1983 | Joynt et al. | 296/182 |
| 4,480,866 | 11/1984 | Komatsu | 296/21 |
| 4,488,752 | 12/1984 | Broussard | 296/171 |

FOREIGN PATENT DOCUMENTS

| 943535 | 3/1949 | France | 52/79.7 |
|---|---|---|---|

*Primary Examiner*—Robert R. Song
*Attorney, Agent, or Firm*—Quarles & Brady

[57] ABSTRACT

A basic operator's cab can be expanded after assembly to provide a widening thereof as well as an expansion in length or both a widening and length expansion. The operator's cab is generally of a rectangular configuration and is fabricated with a diagonal separation line. The two basic sections are connected by nuts and bolts to allow disassembly and movement thereafter. Depending upon customer preference, these two basic sections can be expanded by placing insert members between the two sections which insert members will afford a widening or a lengthening or a combination of both. The insert members can be secured to the two basic sections by use of removable fasteners such as nuts and bolts which also connect the cab sections. The three-way expansion and insert feature for the operator's cab can be utilized for any type of modular unit which is to be expanded and is most particularly suited for large equipment such as blast hole drills.

9 Claims, 7 Drawing Figures

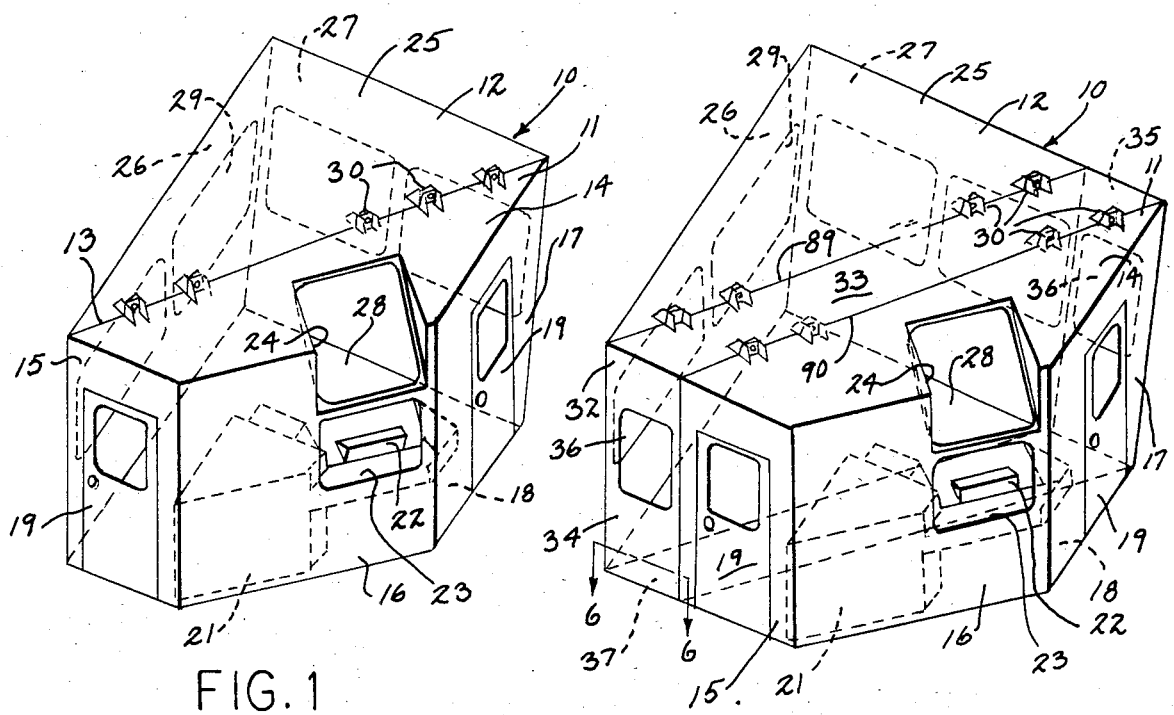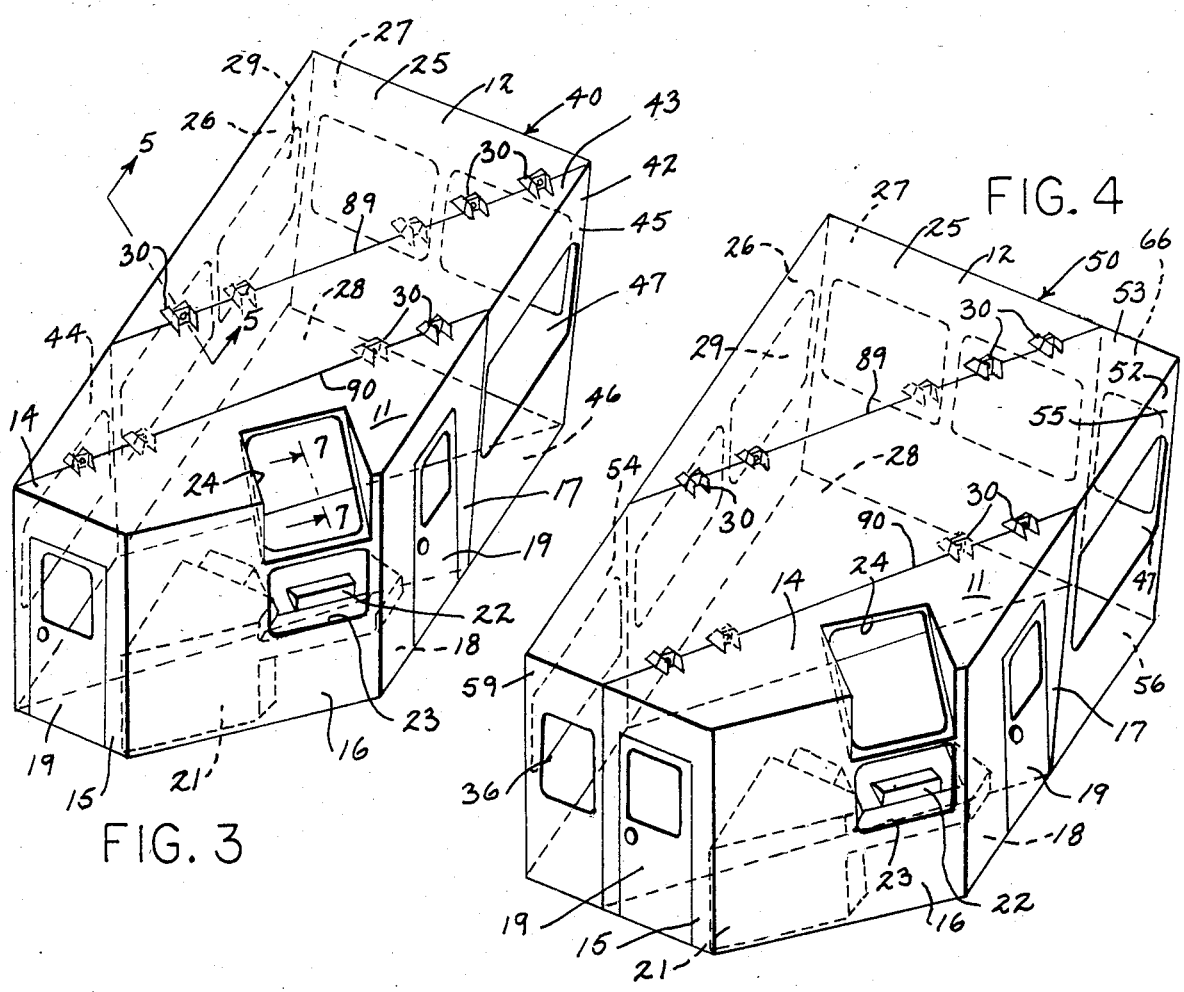

EXPANDABLE OPERATOR'S CAB

BACKGROUND OF THE INVENTION

This invention relates to a modular enclosure unit which can be expanded in several dimensions with selected insert members of varying dimensions. More particularly, this invention relates to an expandable operator's cab for large equipment such as a blast hole drill which cab is of a generally rectangular configuration and is separated diagonally so that it can be later expanded either in width, length or both length and width by placing and securing selected insert members between the separated units.

It is known to utilize spacer components to widen a vehicle. For example, in U.S. Pat. No. 4,342,146, cut lines such as indicated by the numerals 56, 58, 60 and 62 extend through various portions of a van. Spacers such as spacer panels 70, 78 and 80 are then fitted between the cut portions In U.S. Pat. No. 4,156,537 an operator's cab for a drill rig is expanded by the use of a door 35 which is expanded or bulged to provide a greater interior cab space. Other efforts to expand space in a vehicle are indicated in U.S. Pat. No. 4,397,497 showing an expandable camper body for a pickup truck.

The prior art does not afford a solution to the problem of expanding an operator's cab in a manner such that the basic cab structure can be expanded in several dimensions to meet the user's requirements. In those instances where an expandable cab structure is involved the only increase in dimension is provided by a bulging door.

It is an advantage of the present invention to provide an expandable cab from two separable sections of a basic modular cab unit. Another advantage is an expandable cab which can be widened, lengthened or both widened and lengthened by the use of insert sections. Still another advantage of this invention is in providing an expandable cab wherein the modular units can be readily detached from each other and the insert members readily attached thereto. Other advantages are a split cab concept wherein all of the internal components can be assembled in their respective sections before the sections are joined together so that materials need not be passed through narrow door openings or window sections. Other advantages are an expandable cab of the foregoing type which results in a reduction in modification labor time, reworking of materials and the over-all enhancement of the cab aesthetics and marketability.

SUMMARY OF THE INVENTION

The foregoing advantages are accomplished and the shortcomings of the prior art are overcome by the present expandable operator's cab or the like which is of a generally rectangular configuration and wherein the cab is split or separated diagonally from corner to corner. Two cab sections are thereby defined which can be moved away from one another in a direction perpendicular to the side walls, the end walls or the split line. A mating insert is constructed and arranged to be connected between the separated sections to establish an enlarged generally rectangular cab configuration in width or length or a combination thereof. In one of the preferred embodiments, one of the sections will house all of the control apparatus with the cab sections being interconnected by easily removable fastening means such as bolts and nuts and the insert members being secured to the cab sections in a similar manner. In one embodiment, an insert member is constructed and arranged to establish an enlarged rectangular cab having an increase in width; in another embodiment the insert provides an increase in length and in yet another embodiment the insert provides both an increase in length and width. In still another embodiment of the invention, one of the sections of the cab is composed of a five-sided structure including a viewing window extending through both a roof and a side wall portion.

A method of fabricating an expandable operator's cab or the like is also presented wherein a cab is constructed with two cab sections which are separable along a straight line extending across the cab to provide two modular sections that can be moved away from one another. The cab sections are moved in a direction such that the separated lines are parallel to each other. A mating insert section is placed between the two sections to provide with one insert a widening of said cab, to provide with another insert a lengthening of said cab and to provide with yet another insert both a widening and a lengthening. The selected mating insert section is secured to the two sections.

BRIEF DESCRIPTION OF THE DRAWINGS

A better understanding of the expandable cab of this invention will be accomplished by reference to the drawings wherein:

FIG. 1 is a top perspective view illustrating the two sections of the modular cab of this invention.

FIG. 2 is a view similar to FIG. 1 except showing the cab unit of FIG. 1 with an insert member placed therein so as to provide an increase in width.

FIG. 3 is a view similar to FIG. 2 showing an insert member placed in the expandable cab to provide an increase in length of the cab.

FIG. 4 is a view similar to FIG. 2 showing an insert member which will provide an increase in width and length of the cab.

DESCRIPTION OF THE EMBODIMENTS

Figure 5:
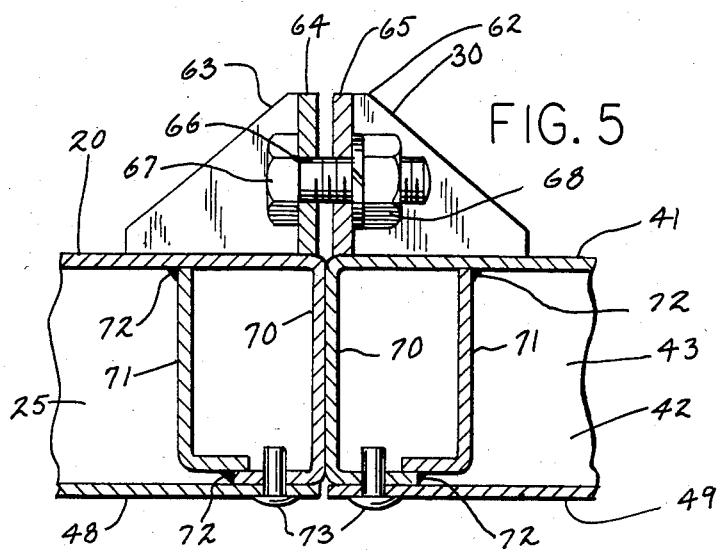
FIG. 5 is a view in vertical section taken along line 5—5 of FIG. 3.

Proceeding to a detailed description of the embodiments of the present invention and particularly FIGS. 1 and 2, the expandable generally rectangular cab generally referred to at 10 will include a first modular section 11 and a second modular section 12. A cut line 13 will be provided diagonally across the two generally rectangular sections 11 and 12. The first modular section 11 will include a roof 14 as well as a side wall 17 and end walls 15 and 16. The usual floor 18 will extend therebetween and doors 19 are provided for entry into the cab. The usual console 21 is enclosed in the first section 11 as well as an instrument panel 22 which is adjacent an opening 23 for viewing the drilling deck. The standard operator's viewing window 24 is provided in a portion of the roof 14 as well as in the end wall 16 for observing the mast. The second cab section 12 also has a roof 25, a side wall 26, and an end wall 27, as well as an interconnecting floor 28. Windows are indicated by numeral 29. Fastening members 30 interconnect the roofs 14 and 25, respectively, of the two sections 11 and 12 together in a basic modular unit as illustrated in FIG. 1. This specific connection is depicted in FIG. 5 and will be later described in conjunction with the expandable cab generally 40 illustrated in FIG. 3.

When it is desired to expand the modular cab as shown in FIG. 1 in width, removable fastening members such as 30 will be unfastened and the two modular sections 11 and 12 moved away from one another in a direction perpendicular to the side walls 17 and 26. An insert member 32 will be placed between the separated sections 11 and 12 which will have a unitary roof portion 33, end wall portions 34 and 35 as well as a floor portion 37. Suitable windows 36 will be placed therein. Removable fastening members such as 30 will thereafter be employed to secure the insert member 32 to the adjacent portion of roofs 14 and 25.

Figure 6:
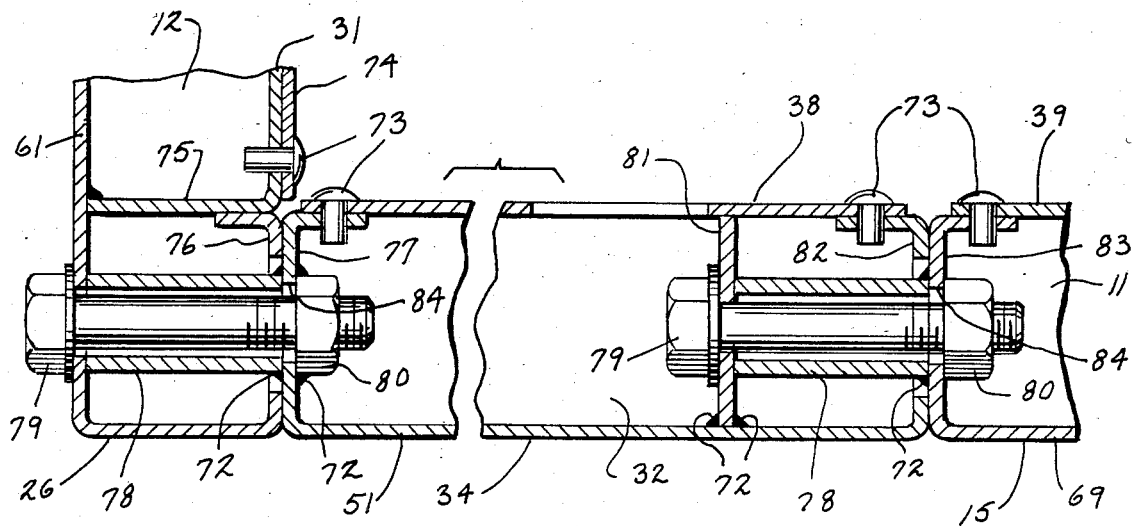
FIG. 6 is a view in vertical section taken along line 6—6 of FIG. 2.

Referring to FIG. 6, it will be seen that the side walls such as 15 and 26 are also interconnected to the insert member 32 by the removal fastening means such as the threaded bolts 79 and the nuts 80. A tubular channel member 78 will extend between the outer wall 61 of the side wall 26 and the L-shaped inner wall section 76. Suitable openings such as 72 will be provided in the L-shaped wall section 76 for the tubular channel member 78. In a similar manner, an L-shaped section 77 is provided in the insert member 32 and extends between the outer wall 51 and the inner wall 38 thereof. An opening 84 is provided for the bolt 79. The insert member 32 is connected at the opposite end to the side wall 15 in a similar manner with the L-shaped sections 82 and 83 and the tubular channel 78. The L-shaped sections 82 and 83 will extend between the outer walls 51 and 69 of the respective end wall portion 34 and the end wall 15 as well as the inner walls 38 and 39. In this instance, an additional partition 81 is secured between the walls 51 and 38, such as by weldments 72, for attachment to the tubular channel 78 and will have an opening to afford passage of the bolt 79 therethrough. Suitable rivets 73 will provide attachment of the L-shaped sections 82 and 83 to the adjacent portions of inside walls 38 and 39 as well as affording attachment of the L-shaped member 77 to the inside wall 38. It will be further noted that an inside panel 74 is riveted such as by the rivet 73 to the inside wall 31 of the side wall 26.

An expandable cab generally 40 is illustrated in FIG. 3 and illustrates the expansion of the modular sections 11 and 12 into a cab having an increase in length or depth. This is afforded by moving the sections 11 and 12 away from each other in a manner perpendicular to the end walls 15 and 27 and placing an insert member 42 between the separated sections. It will be seen that the insert member 42 has a unitary roof portion 43, side wall portions 44 and 45 as well as a floor portion 46. A window 47 is afforded in the side wall portion 45.

As best seen in FIG. 5, the roof 25 of cab section 12 and roof portion 43 of the insert member 42, are interconnected by the fastening members 30. This is accomplished by the upstanding flanges 62 and 63 with transverse intermediate portions 64 and 65 having aligned openings such as 66 so that a bolt 67 can be placed therethrough and a nut 68 secured to the bolt. It can be seen that the L-shaped sections 70 extend downwardly from the roof outer walls 20 and 41 for an abutting relationship. They are secured to the inside walls 48 and 49 by means of the rivets 73. For stabilizing purposes, the L-shaped sections 71 also extend downwardly from the outer walls 20 and 41 and are attached to the walls 20 and 41 as well as to sections 70 by the weldments 72.

Figure 7:
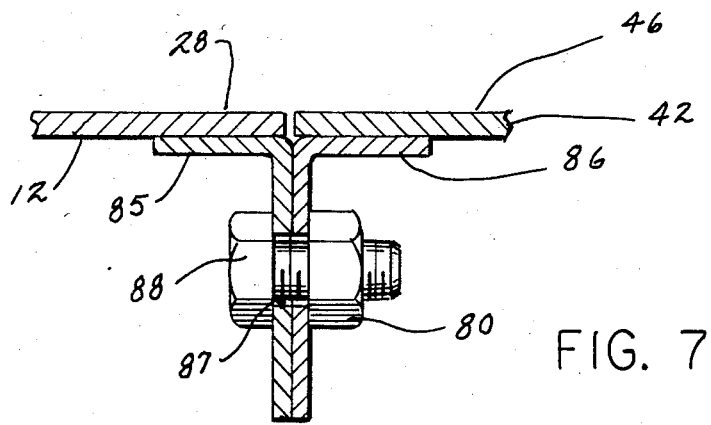
FIG. 7 is a view in vertical section taken along line 7—7 of FIG. 3.

Referring specifically to FIG. 7, a removable attachment of the respective floors 28 and 46 of the cab section 12 to the insert 42 is depicted. This is accomplished by the L-shaped flanges 85 and 86 having openings 87 therein to accommodate the bolt 88 to be fastened by the nut 80.

Referring to FIG. 4, the expandable cab generally 50 is shown which can be expanded in both length and width. In this instance, the two cab sections 11 and 12 will have been moved in a perpendicular manner with respect to the cut line 13. (See FIG. 1) An insert member 52 having the unitary roof portion 53, the side wall portions 54 and 55 and the floor portion 56 will be placed between the two cab sections 11 and 12. The usual windows 36 and 47 will be provided in the insert member 52. In this instance, the insert member 52 will also include the end wall portions 59 and 60.

It will be noted in the foregoing description that the console 21 and the instrument panel 22 are located in the cab section 11. This aids in a simplified construction in that these panels are located in only one section member. If desired, suitable storage cabinets, hangers, etc. could be placed in section 12 if desired. In either event, it will be seen that the placement of the instrumentation or any materials inside the cab structures 10, 40 or 50 is easily effected when the two sections 11 and 12 are separated and obviates having to place them through the doors such as 19 or the windows 29 as would be the case with an initially manufactured, fixed unitary cab structure. It will be further observed that the insert members for the cab structures can accommodate windows of various sizes such as indicated at 36 and 47.

The advantages of the expandable operator's cabs 10, 40 and 50 will be appreciated from the fact that they are fabricated in at least two sections 11 and 12 in conjunction with the insert members 32, 42 and 52 having adjoining and complementary straight walled surfaces such as indicated by the cut line 13 and the abutting surfaces of the flanges 70 and 85, 86. Irrespective of whether a widening, lengthening or both is desired, the cab sections are separated in a manner to provide a parallel displacement from the separated line. This is readily seen by reference to lines 89 and 90 in FIGS. 2, 3 and 4 and a comparison with line 13 in FIG. 1. In the instance where a widening or lengthening is effected with inserts 32 or 42, the corners of the displaced sections 11 and 12 are re-established.

Bolts 67, 79 and 88 with the respective nuts and associated flanges and L-shaped sections are the preferred removable fastening means for securing the roofs, side walls, end walls and floors of the basic sections 11 and 12 together as well as to the adjacent roof, side wall and end wall portions of their respective inserts 32, 42 or 52. If desired, other removable type fasteners could be employed such as of the removable clamping type. While the removable fastening means is the preferred method of fastening the basic units together as well as securing their respective insert members, it is possible to utilize a nut and bolt fastening for the two sections 11 and 12 and when the desired insert is placed therebetween having the adjacent sections welded into position.

The expandable operator's cab structures 10, 40 and 50 are particularly suited for use in conjunction with blast hole drills. If desired, the expandable cab structures could be utilized in conjunction with any material moving or handling machinery such as power shovels or lifting cranes, or in conjunction with construction machinery such as earth moving vehicles or in farm machinery such as in conjunction with large tractors or combines.

We claim:

1. A generally rectangular operator's cab or the like, comprising: a cab split diagonally from corner to corner to define two sections that can be moved away from one another in a direction substantially perpendicular to either the side walls, the end walls, or the split line; and a mating insert constructed and arranged to be connected between the separated sections to reestablish an enlarged generally rectangular cab configuration in width or length or a combination thereof.

2. The operator's cab or the like of claim 1 wherein one of the sections houses all of the control apparatus.

3. The operator's cab or the like of claim 1 wherein said mating insert includes window portions.

4. The operator's cab or the like of claim 1 including removable fastening means for securing said two sections together initially as well as said mating inserts to said sections.

5. The operator's cab or the like of claim 3 wherein said removable fastening means is defined by nut and bolt members.

6. In an expandable operator's cab or the like the improvement comprising: a cab fabricated in at least two sections with straight line separation in a manner to provide a parallel displacement of the two sections from said straight line, a mating insert defining complementary straight walled surfaces which in one instance provides a widening of said cab, in another instance will provide a lengthening of said cab and in a third instance a widening and lengthening, said mating insert re-establishing corners for said displaced two sections in the instance of said widening or said lengthening; and removable fastening means for connecting said two cab sections together.

7. The improvement of claim 6 including removable fastening means to connect said mating insert with said two sections.

8. The improvement of claim 7 wherein said mating insert includes a unitary roof, side or end wall and a floor portion.

9. The improvement of claim 8 wherein said unitary side or end wall portion includes windows.

* * * * *